Figure 9:
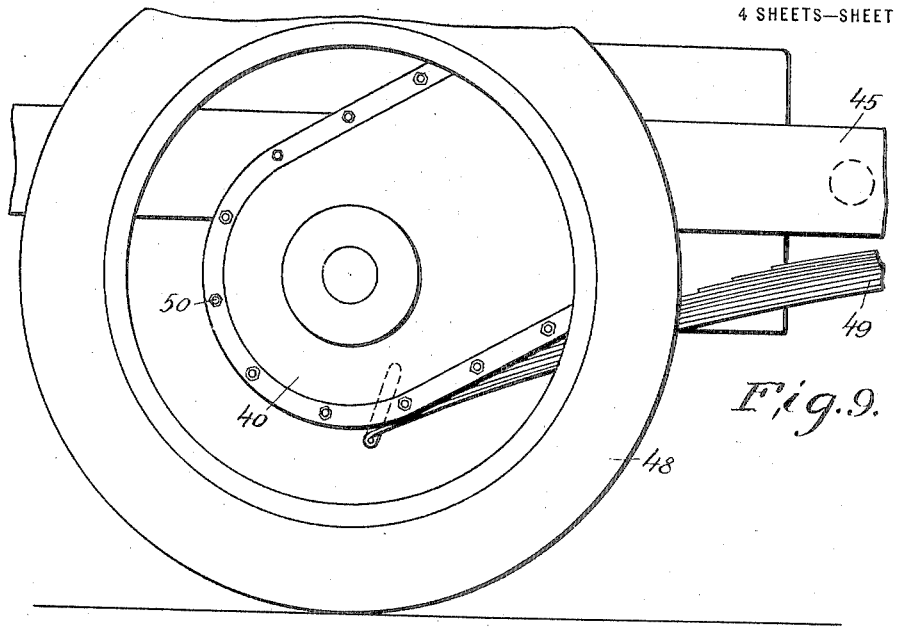

P. E. V. JACOBSEN.
POWER TRANSMITTING DEVICE.
APPLICATION FILED FEB. 18, 1916.
1,307,976.
Patented June 24, 1919.
4 SHEETS—SHEET 1.
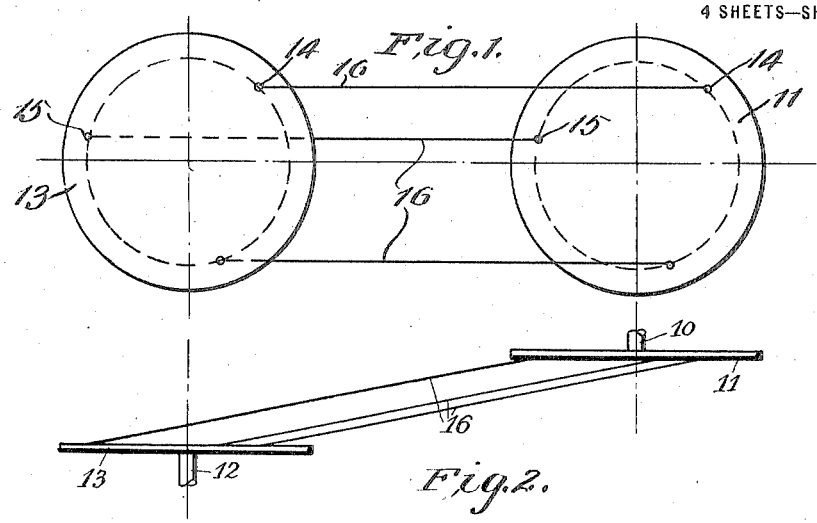
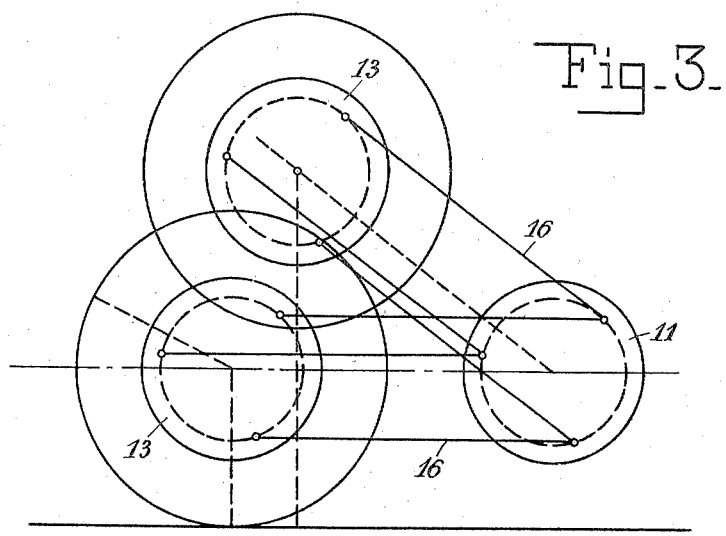
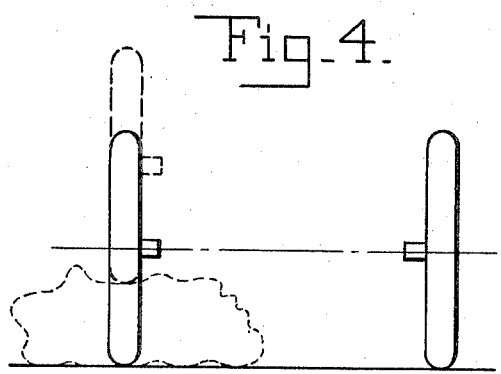

P. E. V. JACOBSEN.
POWER TRANSMITTING DEVICE.
APPLICATION FILED FEB. 18, 1916.
1,307,976.
Patented June 24, 1919.
4 SHEETS—SHEET 2.
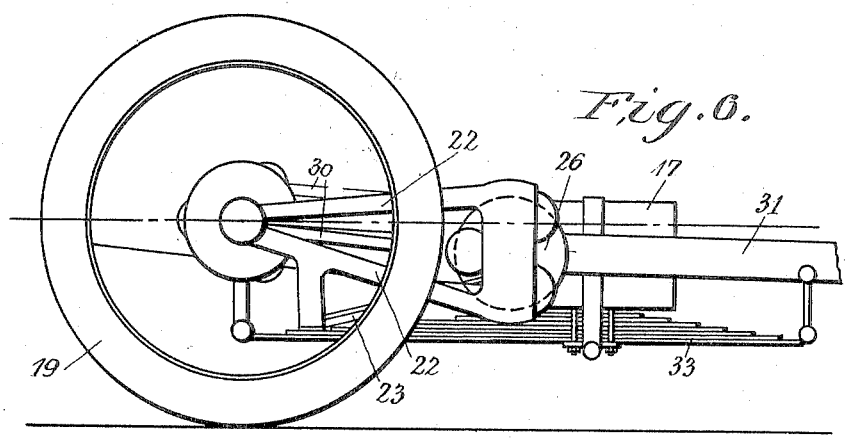
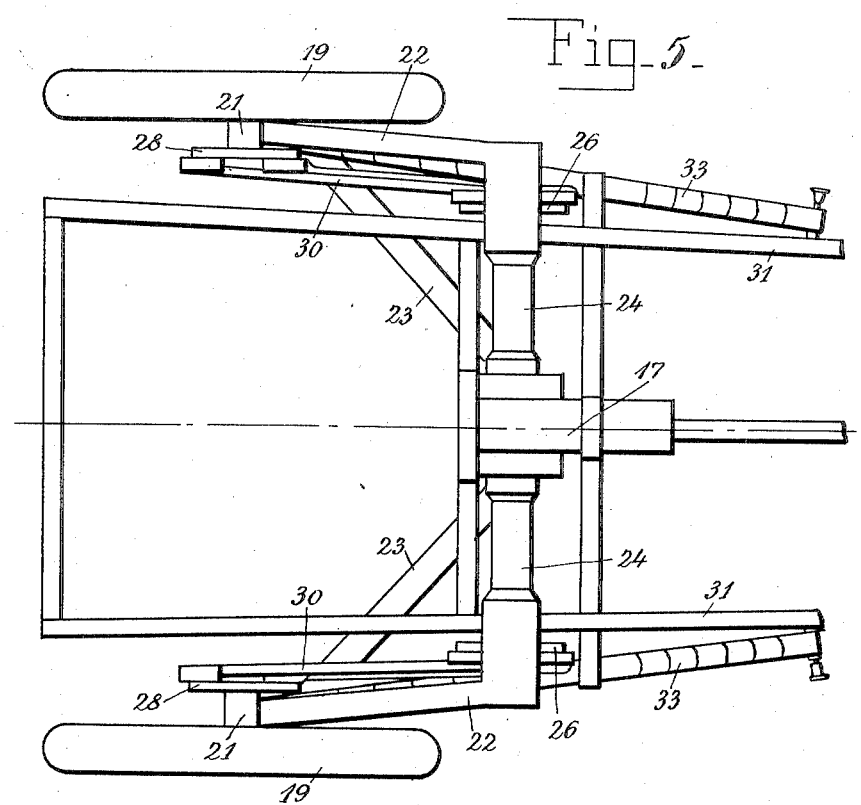

P. E. V. JACOBSEN.
POWER TRANSMITTING DEVICE.
APPLICATION FILED FEB. 18, 1916.
1,307,976.
Patented June 24, 1919.
4 SHEETS—SHEET 3.
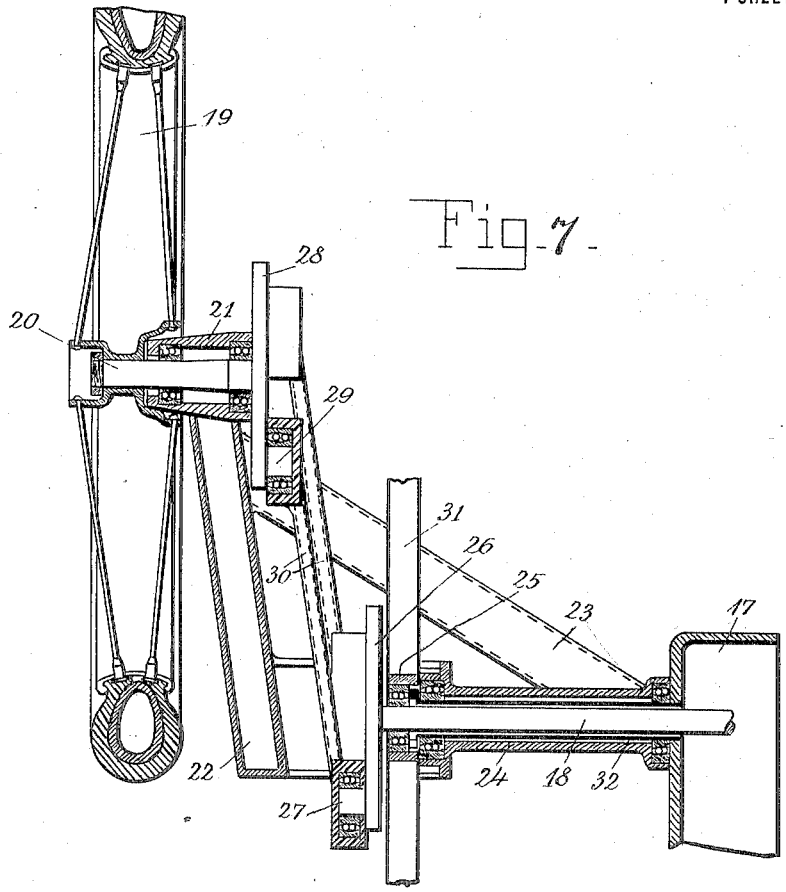
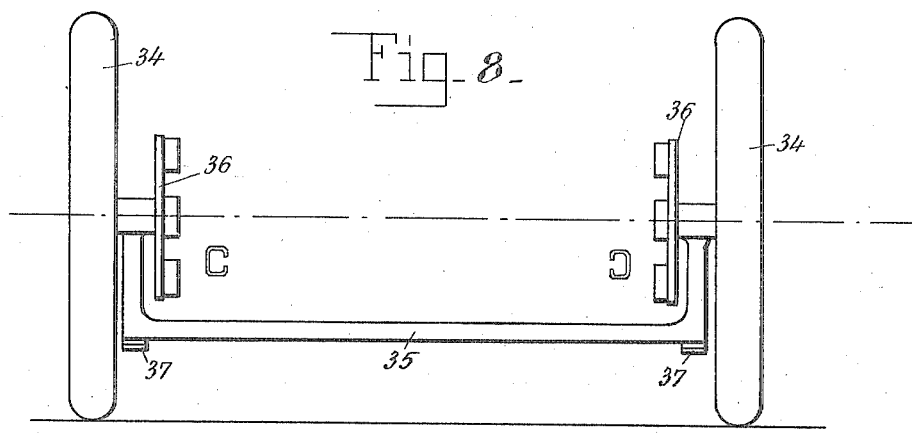

P. E. V. JACOBSEN.
POWER TRANSMITTING DEVICE.
APPLICATION FILED FEB. 18, 1916.

1,307,976.

Patented June 24, 1919.
4 SHEETS—SHEET 4.

Inventor,
Peter Emil Vilhelm Jacobsen,
By Knight Bros
attorneys,

UNITED STATES PATENT OFFICE.

PETER EMIL VILHELM JACOBSEN, OF JYDERUP, DENMARK.

POWER-TRANSMITTING DEVICE.

1,307,976.  Specification of Letters Patent.  Patented June 24, 1919.

Application filed February 18, 1916. Serial No. 79,192.

*To all whom it may concern:*

Be it known that I, PETER EMIL VILHELM JACOBSEN, manufacturer, subject of the King of Denmark, residing at Jyderup, Denmark, have invented certain new and useful Improvements in Power-Transmitting Devices, of which the following is a specification.

The present invention consists in a power transmitting device, adapted to be inserted between two parallel shaft ends facing one another, whether both of these or only one of them be suspended by springs, or so that one of the shafts has a certain freedom to move relatively to the other one. According to this invention, each shaft carries at its free end a disk carrying a number of bearings or journals arranged at corresponding points on the two disks, and so that two and two corresponding bearings or journals are interconnected by rods of equal lengths, inclined in relation to the two shafts, so that they pass free of one another during the rotation of the shafts.

The invention is mainly intended to be used as a power transmitting device for automobiles, locomotives, &c., but it may also be used in connection with other machines for instance machine tools.

The present invention, as compared with other power transmitting devices, for instance toothed gears or chain transmissions, possesses among other advantages the one that it works absolutely without noise.

Various manners of constructing the invention are shown on the drawing where—

Figure 10:
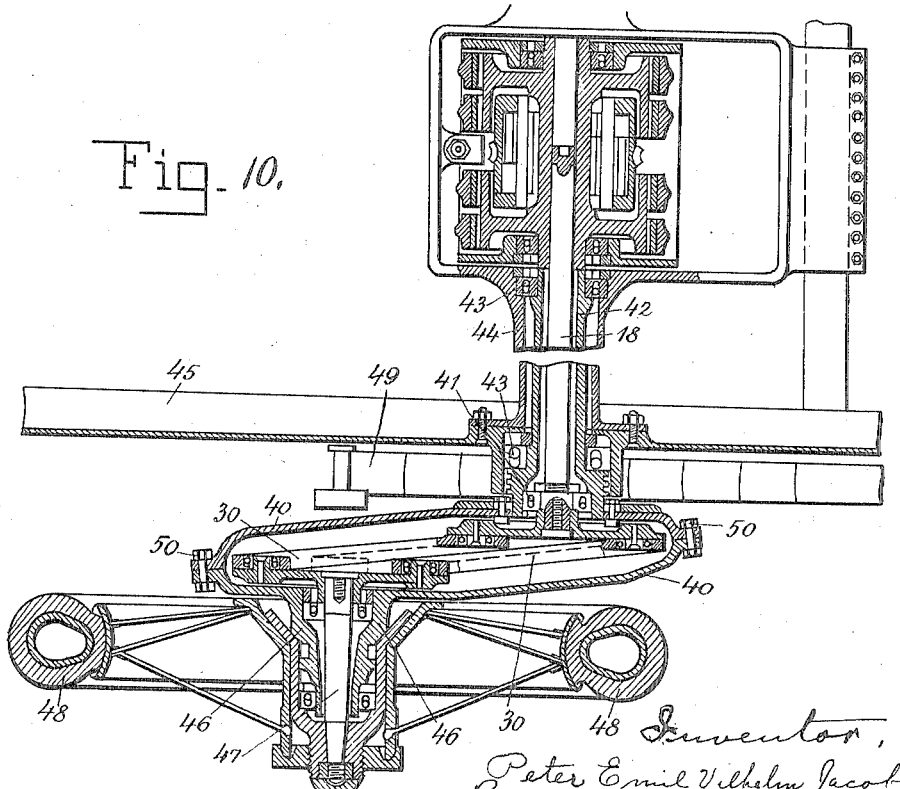

Figures 1 and 2 show, diagrammatically, the invention, in side-elevation and in plan-view respectively, Fig. 3 shows diagrammatically the invention used in connection with an automobile wheel free to rise, independently of the driving shaft, Fig. 4 shows in a diagrammatic way how one of the rear wheels of the automobile is free to rise in its own plane when it passes an obstacle, Fig. 5 shows, in top-view, a manner of constructing the invention where the latter is used to transmit power to the rear wheels of an automobile, Fig. 6 is a view similar to Fig. 5 in side-elevation, Fig. 7 is an enlarged section taken along the axis of a wheel and the axis of the corresponding driving shaft, Fig. 8 shows how the present invention may be combined with the rear wheels of an automobile when the axles of the latter are rigidly interconnected, Fig. 9 shows another manner of carrying into effect the use of the mechanism in connection with the rear wheels of an automobile, and Fig. 10 a section of the same taken through the axes of the wheel and drive shaft in Fig. 9.

As shown in Figs. 1 and 2 there is fastened to one shaft end 10 a disk 11 and to the other shaft end 12 a disk 13. Both of these disks carry correspondingly located bearings 14, 14, 15, 15, etc., and these bearings are interconnected in pairs by rods 16 of equal lengths. Preferably, three such bars should be used, although two bars would actually be sufficient, provided that they are not placed opposite one another. As shown in Fig. 2, the bars 16 are placed so as to form an angle with the axles 10 and 12, so that they pass free of each other, when the axles revolve.

As shown in Fig. 3, an automobile wheel driven by this power transmission may rise vertically when meeting an obstacle, without at the same time being tilted laterally whereby wear on the tire would be caused. When the wheel rises vertically, as shown in Fig. 4, both tires will continue to rest squarely on the ground and, as shown in Fig. 3, this vertical displacement has no influence on the rotation of the wheel.

Figs. 5 and 6 show the rear portion of an automobile chassis where the rear wheels are driven by the present power transmitting device. From the motor the power is transmitted through an ordinary gear-box 17 and the angular driving device connected thereto, for instance conical gears, worm gear or the like, to a transverse intermediate shaft 18 in the chassis, from where the power is transmitted to the rear wheels 19. There exists no rear axle in the ordinary sense of the word, but the rear wheels are mounted separately on pins 20 (Fig. 8), journaled in bearings 21, connected each by one or more bars 22 and braces 23 to its corresponding tube 24 encircling the shaft 18. In this manner it is attained that the wheel-axles 20 and the intermediate shaft 18 are always kept parallel.

The intermediate shaft 18 is actually composed of two halves, and each half is carried partly by a ball-bearing 25 inclosed in a housing in the chassis frame and partly by the differential mechanism. Either half of the intermediate shaft carries a disk 26 located in a fork-shaped extension of the tube 24, and the disk 26 carries three journals 27. On the shaft 20, there is placed a similar disk 28 with three journals 29, and the journals 27 and 29 are interconnected by three rods 30. As shown in Fig. 8, ball-bearings are used throughout.

The chassis-frame 31 is located in the same fork-shaped extension of the tube 24 as the disk 26, and it is connected to the gear-box 17 by means of a fixed tube 32.

The rear portion of the automobile is hung, by means of cantaliver-springs 33, onto the bushings 21 encircling the journal-pins of the rear wheels.

Another manner of constructing the mechanism for use in connection with the rear wheels of an automobile is shown in Figs. 10 and 11. The arm 22 shown in Fig. 8 is here omitted and replaced by a casing 40, completely inclosing the bars 30. The intermediate shaft 18 is supported in ball-bearings 41 inside a tube 42, being in firm connection with the casing 40. The tube 42 rests in ball-bearings 43 inside a tube 44, being in firm connection with the chassis-frame 45.

On the casing 40 there is placed a bushing 46, encircling the journal 47 of the wheel. The wheel 48 is fastened to the axle 47 and rotates on the outside of the bushing 46, so that the pressure of the wheel against the ground is transmitted directly through the bushing 46 to the casing 40 which is firmly connected to the tube 42. A cantaliver-spring 49 transmits the wheel pressure to the chassis-frame 45. The construction here described is especially preferable, partly because the power transmitting rods 30 and the parts belonging thereto are completely inclosed in a casing which may form a dust-proof oil-bath or the like, partly because space is saved, the casing 40, besides being a protecting member, also securing the constant parallelism of the wheel axle 47 with the intermediate shaft 18. The casing 40 consists of two halves, joined by means of screw-bolts 50, so that the device may easily and quickly be taken apart.

Among the advantages of the present invention for use on automobiles, the following may be mentioned especially.

The differential mechanism, the brake and the driving wheels with the parts belonging thereto are connected to the intermediate shaft and thereby to the chassis in such a manner that they do not act on the wheels directly, but only through the carriage-springs. Thereby the spring action becomes more efficient, and the hammering of the wheels against the road-surface is diminished, as the wheels are not encumbered by dead weight. The brake may then without difficulty be applied to the intermediate shaft, whereby the construction becomes simpler and stronger, and the wheel-axles have no other function to perform than to carry the wheels. In contrast to chain-drives and toothed gears this mechanism is noiseless.

If nevertheless it is desired to retain a rigid rear axle, the latter may conveniently be used in connection with the present invention. In Fig. 8 is shown rear wheels 34 of an automobile, their axles being journaled in a stiff frame 35. As described above, disks 36 are fastened to the axles, so that the connecting rods of the power-transmission may be flexibly coupled to these disks. The carriage is suspended from the frame 35 by means of cantaliver-springs 37. This construction is especially useful for heavy trucks.

Having now particularly described and ascertained the nature of my said invention and in what manner the same is to be performed, I declare that what I claim is:—

1. In a rear construction for motor vehicles having a driven shaft parallel to the axis of rotation of the rear vehicle wheel, a disk on the end of said shaft having trunnions spaced equidistant thereon, a similar disk and trunnions on the vehicle wheel, and links connecting said trunnions in a manner to transmit rotation from the driven shaft to the vehicle wheel, said links being positioned at an angle to the plane of rotation of the axis so that they may freely pass each other during the rotation of the axis.

2. In a rear construction for motor vehicles having a driven shaft parallel to the axis of rotation of the rear vehicle wheel, a disk on the end of said shaft having trunnions spaced equidistant thereon, a similar disk and trunnions on the vehicle wheel, and links connecting said trunnions in a manner to transmit rotation from the driven shaft to the vehicle wheel, said links being positioned at an angle to the plane of rotation of the axis so that they may freely pass each other during the rotation of the axis, and a radius member mounted for rocking movement upon the shaft and vehicle wheel and adapted to maintain said shaft and vehicle wheel in spaced relation.

In testimony whereof the foregoing specification is signed in the presence of two witnesses.

PETER EMIL VILHELM JACOBSEN.

Witnesses:
JULIUS LEHMANN,
ORR GIERSING.